United States Patent
Glaza et al.

(10) Patent No.: US 7,672,774 B2
(45) Date of Patent: Mar. 2, 2010

(54) METHOD AND SYSTEM FOR DETERMINING TRAFFIC INFORMATION TRAFFIC PROFILES

(75) Inventors: Mark J. Glaza, Warren, MI (US); Larry J. Tretyak, Highland, MI (US); James M. Smith, Utica, MI (US)

(73) Assignee: General Motors Company, Detroit, MI (US)

( * ) Notice: Subject to any disclaimer, the term of this patent is extended or adjusted under 35 U.S.C. 154(b) by 1304 days.

(21) Appl. No.: 11/145,662

(22) Filed: Jun. 6, 2005

(65) Prior Publication Data

US 2006/0291633 A1   Dec. 28, 2006

(51) Int. Cl.
*G06F 19/00* (2006.01)

(52) U.S. Cl. .................. 701/117; 701/118; 701/119; 340/906; 340/907

(58) Field of Classification Search .................. 701/117, 701/118, 120, 119; 340/905–907; 342/357.1
See application file for complete search history.

(56) References Cited

U.S. PATENT DOCUMENTS

| 4,812,843 | A | 3/1989 | Champion, III et al. |
|---|---|---|---|
| 5,627,549 | A | 5/1997 | Park |
| 6,249,252 | B1 | 6/2001 | Dupray |
| 6,542,818 | B1 | 4/2003 | Oesterling |
| 6,546,257 | B1 | 4/2003 | Stewart |
| 6,819,268 | B2 | 11/2004 | Wakamatsu et al. |
| 2002/0067288 | A1 | 6/2002 | Wakamatsu et al. |
| 2003/0153329 | A1 | 8/2003 | Stefan et al. |
| 2005/0215194 | A1* | 9/2005 | Boling et al. ............. 455/3.02 |

\* cited by examiner

*Primary Examiner*—Gertrude Arthur Jeanglaud

(57) ABSTRACT

A method of determining traffic information for a mobile vehicle includes receiving a plurality of service requests at a call center from a telematics unit via a wireless connection. The service request includes time, date, and vehicle location data. A database of the received service requests is compiled. A plurality of eligible service requests is determined based on the time and date of the received service requests in the database. A traffic profile is determined based on a comparison of digital map data to vehicle location data of the eligible service requests.

18 Claims, 3 Drawing Sheets

Service Requests (type; time; date; location):

- Business assist.; 10:03; 3/8/2005; 53° 21' N; 113° 41' W
- Traffic info.; 9:05; 3/9/2005; 53° 53' N; 113° 27' W ⎯ 310
- Directory assist.; 12:51; 3/10/2005; 53° 44' N; 113° 28' W
- Roadside assist.; 22:15; 3/11/2005; 53° 14' N; 113° 12' W
- Traffic info.; 10:03; 3/12/2005; Clark St./Main St. Intersect., Anytown
- Traffic info.; 17:30; 3/14/2005; 524 S. Main St., Anytown ⎯ 320
- Nav. assist.; 23:15; 3/14/2005; Grand Monument Landmark

...

METHOD AND SYSTEM FOR DETERMINING TRAFFIC INFORMATION TRAFFIC PROFILES

FIELD OF THE INVENTION

This invention relates generally to data transmissions over a wireless communication system. More specifically, the invention relates to a strategy for determining traffic information traffic profiles.

BACKGROUND OF THE INVENTION

Many passenger vehicles now incorporate an integrated communication system, such as a Mobile Vehicle Communication Units (MVCU), providing a variety of fee-based subscription services in a mobile environment. The MVCU is typically a vehicle telematics device including a cellular radio, satellite transceiver, and/or global positioning capabilities. Typically, a radio communication link is established between the MVCU and a call center through a Wide Area Network (WAN), using a node of the WAN in the vicinity of the MVCU.

A vehicle user links to the call center via the MVCU to make various service requests, such as requests for traffic information. The traffic information includes, in one embodiment, anticipated travel times as well as what factor(s) are impeding the flow of traffic along a route. Factors that impede traffic flow include, but are not limited to, reduction of posted speed limits, traffic incidents, accidents, weather conditions, lane and road closures, construction, and other planned or unplanned events impeding the flow of traffic. This information may be useful to the vehicle user for planning an alternate route or for other purposes.

When a service request for traffic information is made, the vehicle location is communicated to the call center along with the request. The call center determines the traffic information for the vehicle location and/or its vicinity and then sends the information to the MVCU. In some instances, such as during work commutes, it would be desirable to provide traffic information for a portion or the entire route taken by the vehicle user rather than just a specific location and/or vicinity of the request. However, this requires the vehicle user to specify the driver route in the form of a traffic profile. Configuration of the traffic profile may be performed through a site on the World-Wide-Web or by other means. This process may entail specifying each of the roads along the route as well as the days and times of the commute. As such, the configuration may be complicated and time-consuming.

It is an object of this invention, therefore, to provide a strategy for determining traffic information traffic profiles from service requests, and to overcome the deficiencies and obstacles described above.

SUMMARY OF THE INVENTION

One aspect of the invention provides a method of determining traffic conditions for a mobile vehicle. The method includes receiving a plurality of service requests at a call center from a telematics unit via a wireless connection. The service request includes time, date, and vehicle location data. A database of the received service requests is compiled. A plurality of eligible service requests is determined based on the time and date of the received service requests in the database. A traffic profile is determined based on a comparison of digital map data to vehicle location data of the eligible service requests.

Another aspect of the invention provides a computer usable medium including computer readable code for determining traffic conditions for a mobile vehicle. The medium includes computer readable program code for receiving a plurality of service requests at a call center from a telematics unit via a wireless connection. The service request includes time, date, and vehicle location data. The medium further includes computer readable program code for compiling a database of the received service requests, and computer readable program code for determining a plurality of eligible service requests based on the time and date of the received service requests in the database. The medium further includes computer readable program code for determining a traffic profile based on a comparison of digital map data to vehicle location data of the eligible service requests.

Another aspect of the invention provides a system for determining traffic information for a mobile vehicle. The system includes means for receiving a plurality of service requests at a call center from a telematics unit via a wireless connection. The service request includes time, date, and vehicle location data. The system further includes means for compiling a database of the received service requests, and means for determining a plurality of eligible service requests based on the time and date of the received service requests in the database. The system further includes means for determining a traffic profile based on a comparison of digital map data to vehicle location data of the eligible service requests.

The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 3 illustrates an exemplary database of service requests, in accordance with one embodiment of the present invention.

DETAILED DESCRIPTION OF THE PRESENTLY PREFERRED EMBODIMENTS

Figure 1:
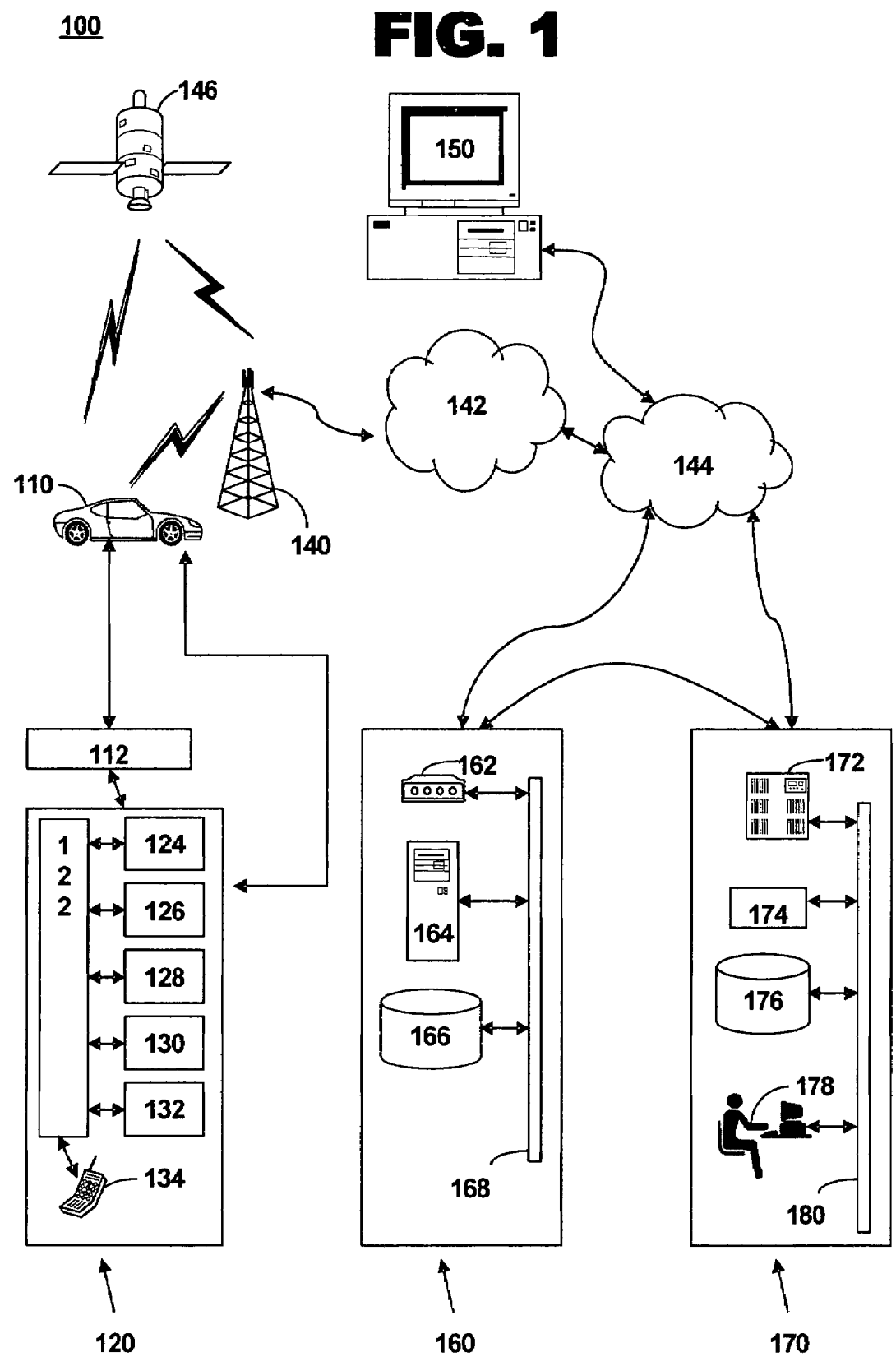
FIG. 1 illustrates a system for determining traffic information for a mobile vehicle using a satellite-radio broadcast system, in accordance with one embodiment of the present invention.

FIG. 1 illustrates a system for determining traffic information for a mobile vehicle using a satellite-radio broadcast system, in accordance with one embodiment of the present invention and shown generally by numeral 100. Mobile vehicle communication system (MVCS) 100 includes a mobile vehicle communication unit (MVCU) 110; a vehicle communication network 112; a telematics unit 120; one or more wireless carrier systems 140; one or more communication networks 142; one or more land networks 144; one or more satellite broadcast systems 146; one or more client, personal or user computers 150; one or more web-hosting portals 160; and one or more call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 is also referred to as a mobile vehicle in the discussion below. In operation, MVCU 110 is implemented as a motor vehicle, a marine vehicle, or as an aircraft, in various embodiments. MVCU 110 may include additional components not relevant to the present discussion.

Vehicle communication network 112 sends signals to various units of equipment and systems within vehicle 110 to perform various functions such as monitoring the operational state of vehicle systems, collecting and storing data from the vehicle systems, providing instructions, data and programs to various vehicle systems, and calling from telematics unit 120. In facilitating interactions among the various communication and electronic modules, vehicle communication network 112 utilizes interfaces such as controller-area network (CAN), Media Oriented System Transport (MOST), Local Interconnect Network (LIN), Ethernet (10 base T, 100 base T), International Organization for Standardization (ISO) Standard 9141, ISO Standard 11898 for high-speed applications, ISO Standard 11519 for lower speed applications, and Society of Automotive Engineers (SAE) standard J1850 for higher and lower speed applications. In one embodiment, vehicle communication network 112 is a direct connection between connected devices.

Telematics unit 120 includes a processor 122 connected to a wireless modem 124, a global positioning system (GPS) unit 126, an in-vehicle memory 128, a microphone 130, one or more speakers 132, and an embedded or in-vehicle mobile phone 134. In other embodiments, telematics unit 120 is implemented without one or more of the above listed components such as, for example, speakers 132. Telematics unit 120 may include additional components not relevant to the present discussion.

In one embodiment, processor 122 is implemented as a microcontroller, controller, host processor, or vehicle communications processor. In an example, processor 122 is implemented as an application specific integrated circuit (ASIC). In another embodiment, processor 122 is implemented as a processor working in conjunction with a central processing unit (CPU) performing the function of a general purpose processor. GPS unit 126 provides latitudinal and longitudinal coordinates of the vehicle responsive to a GPS broadcast signal received from one or more GPS satellite broadcast systems (not shown). In-vehicle mobile phone 134 is a cellular-type phone such as, for example a digital, dual-mode (e.g., analog and digital), dual-band, multi-mode or multi-band cellular phone.

Processor 122 executes various computer programs that control programming and operational modes of electronic and mechanical systems within MVCU 110. Processor 122 controls communications (e.g., call signals) between telematics unit 120, wireless carrier system 140, and call center 170. Additionally, processor 122 controls reception of communications from satellite broadcast system 146. In one embodiment, a voice-recognition application is installed in processor 122 that can translate human voice input through microphone 130 to digital signals. Processor 122 generates and accepts digital signals transmitted between telematics unit 120 and a vehicle communication network 112 that is connected to various electronic modules in the vehicle. In one embodiment, these digital signals activate the programming mode and operation modes, as well as provide for data transfers such as, for example, data over voice channel communication. In this embodiment, signals from processor 122 are translated into voice messages and sent out through speaker 132.

Wireless carrier system 140 is a wireless communications carrier or a mobile telephone system and transmits to and receives signals from one or more MVCU 110. Wireless carrier system 140 incorporates any type of telecommunications in which electromagnetic waves carry signal over part of or the entire communication path. In one embodiment, wireless carrier system 140 is implemented as any type of broadcast communication in addition to satellite broadcast system 146. In another embodiment, wireless carrier system 140 provides broadcast communication to satellite broadcast system 146 for download to MVCU 110. In an example, wireless carrier system 140 connects communication network 142 to land network 144 directly. In another example, wireless carrier system 140 connects communication network 142 to land network 144 indirectly via satellite broadcast system 146.

Satellite broadcast system 146 transmits radio signals to telematics unit 120 within MVCU 110. In one embodiment, satellite broadcast system 146 may broadcast over a spectrum in the "S" band (2.3 GHz) that has been allocated by the U.S. Federal Communications Commission (FCC) for nationwide broadcasting of satellite-based Digital Audio Radio Service (DARS).

In operation, broadcast services provided by satellite broadcast system 146 are received by telematics unit 120 located within MVCU 110. In one embodiment, broadcast services include various formatted programs based on a package subscription obtained by the user and managed by telematics unit 120. In another embodiment, broadcast services include various formatted data packets based on a package subscription obtained by the user and managed by call center 170. In an example, data packets received by telematics unit 120 are implemented by processor 122. In another example, data packets received by telematics unit 120 are communicated to modified MVCUs within the MVCS.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal, or user computer 150 includes a computer usable medium to execute Internet browser and Internet-access computer programs for sending and receiving data over land network 144 and, optionally, wired or wireless communication networks 142 to web-hosting portal 160. Computer 150 sends user preferences to web-hosting portal 160 through a web-page interface using communication standards such as hypertext transport protocol (HTTP), and transport-control protocol and Internet protocol (TCP/IP). In one embodiment, the data includes directives to change certain programming and operational modes of electronic and mechanical systems within MVCU 110.

In operation, a client utilizes computer 150 to initiate setting or re-setting of user preferences for MVCU 110. In an example, a client utilizes computer 150 to provide radio station presets as user preferences for MVCU 110. User-preference data from client-side software is transmitted to server-side software of web-hosting portal 160. In an example, user-preference data is stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 transmits digital data to and from modem 162, data that is then transferred to web server 164. In one embodiment, modem 162 resides inside web server 164. Land network 144 transmits data communications between web-hosting portal 160 and call center 170.

Web server 164 receives user-preference data from computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. Web server 164 includes computer applications and files for managing and storing personalization settings supplied by the client, such as door lock/unlock behavior, radio station preset selections, climate controls, custom button configurations, and theft alarm settings. For each client, the web server potentially stores hundreds of preferences for wireless vehicle communication, networking, maintenance, and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120 in MVCU 110. In another embodiment, the call center is a voice call center, providing verbal communications between an advisor in the call center and a subscriber in a mobile vehicle. In yet another embodiment, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. In one embodiment, communication services manager 174 includes at least one digital and/or analog modem. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services including initiating data over voice channel wireless communication, enrollment services, navigation assistance, directory assistance, roadside assistance, business or residential assistance, information services assistance, emergency assistance, communications assistance, and traffic information requests. The traffic information includes anticipated travel times as well as what factor(s) are impeding the flow of traffic along a route. The traffic information may be provided for a single geographic location or for a portion or an entire route based on a traffic profile generated as described below. Communication services manager 174 receives service-preference requests for a variety of services from the client via computer 150, web-hosting portal 160, and land network 144. Communication services manager 174 transmits user-preference and other data such as, for example, primary diagnostic script to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 may provide requested information to communication services advisor 178.

In one embodiment, communication services advisor 178 is implemented as a real advisor. In an example, a real advisor is a human being in verbal communication with a user or subscriber (e.g., a client) in MVCU 110 via telematics unit 120. In another embodiment, communication services advisor 178 is implemented as a virtual advisor. In an example, a virtual advisor is implemented as a synthesized voice interface responding to service requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, automated vehicle diagnostic function, and communications assistance. Communication services advisor 178 communicate with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

In operation, an incoming call is routed to telematics unit 120 within mobile vehicle 110 from call center 170. In one embodiment, the call is routed to telematics unit 120 from call center 170 via land network 144, communication network 142, and wireless carrier system 140. In another embodiment, an outbound communication is routed to telematics unit 120 from call center 170 via land network 144, communication network 142, wireless carrier system 140, and satellite broadcast system 146. In this embodiment, an inbound communication is routed to call center 170 from telematics unit 120 via wireless carrier system 140, communication network 142, and land network 144.

Figure 2:
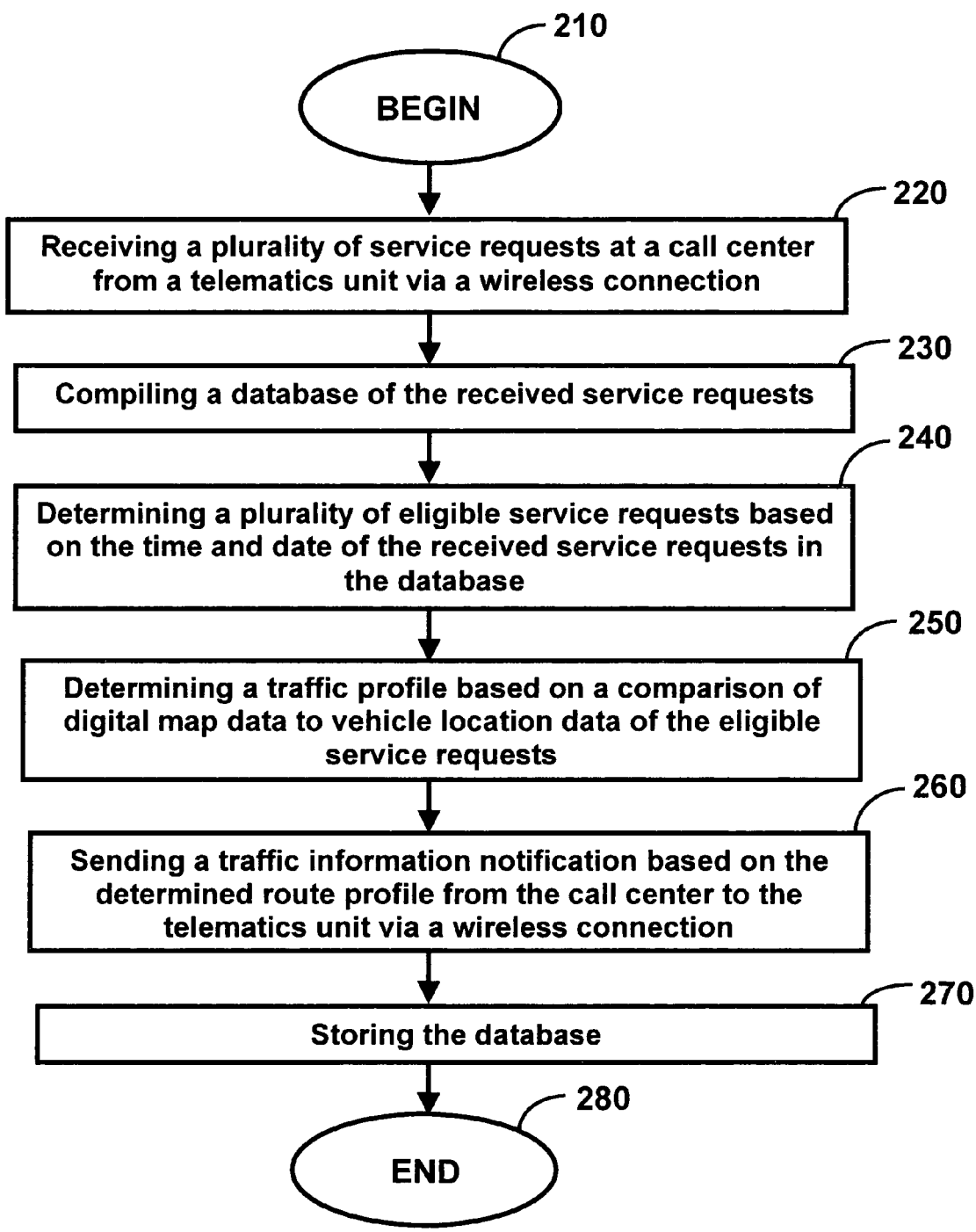
FIG. 2 illustrates a flowchart of a method of determining traffic information for a mobile vehicle, in accordance with one embodiment of the present invention.

FIG. 2 illustrates a flowchart of a method 200 representative of one embodiment of a method of determining traffic information for a mobile vehicle. Method 200 begins at 210. The present invention may take the form of a computer usable medium including a program for determining traffic information for a mobile vehicle in accordance with the present invention. The program, stored in the computer usable medium, includes computer program code for executing the method steps described and illustrated in FIG. 2. The program is, in various embodiments, stored and executed by the MVCU 110, web-hosting portal 160, call center 170, and associated (sub-) components as needed to determine a traffic profile from a plurality of service requests.

At step 220, a plurality of service requests is received at the call center 170 from the telematics unit 120 via a wireless connection, such as the wireless carrier system 140. Each service request includes the time, date, and vehicle location data from when and where it was placed. In one embodiment, the service request is a traffic information request. In another embodiment, the service request is a request for initiating data over voice channel wireless communication, enrollment services, call assistance, navigation assistance, directory assistance, roadside assistance, business or residential assistance, information services assistance, emergency assistance, and communications assistance. The service request is initiated by, for example, depressing an assistance button, issuing a voice command, or other actions.

The vehicle location data includes latitudinal and longitudinal coordinates provided by the GPS unit 126 and/or location identifier data, in one embodiment. In another embodiment, the vehicle location data includes speed data. In another embodiment, the vehicle location data includes a heading data. Speed data can be obtained using any appropriate technique, such as observing at least one odometer pulse, observing communications traffic over a vehicle network, requesting data from an antilock braking system, comparing at least two GPS locations and the time span between the at least two GPS locations, wheel sensor data, and the like. Heading data can be obtained using any appropriate technique, such as observing a compass reading, comparing at least two GPS location readings, observing wheel sensor data, and the like. The location identifier data includes, in one embodiment, information for geographically locating the vehicle such as an address, a road identifier, an intersection, a landmark (e.g., a building, monument, a body of water, etc.), and the like. During operation of the vehicle, service requests are made from numerous geographic locations at different times. The service requests, such as traffic information requests, may be made while the vehicle user is commuting, traveling, or operating the vehicle for other purposes.

At step 230, the received service requests are compiled into a database. An exemplary database 300 of service requests is shown in FIG. 3. Database 300 service requests include information relating to the type, time, date, and location of the service requests. In one embodiment, the database 300 is compiled in the web hosting portal 160. In another or the same embodiment, the database 300 is compiled at the call center 170. In yet another embodiment, the database 300 is compiled in another location in communication with the MVCU 110 and/or the call center 170. Those skilled in the art will recognize that the database 300 may be maintained, distributed, edited, archived, and the like in numerous fashions.

A database including a larger number of service requests may provide a more accurate determination of a traffic profile in accordance with the present invention. The service requests are compiled into the database 300 until one or more condition(s) is/are met. The conditions needed to provide a sufficiently accurate traffic profile may be determined by experimentation or other means known to one skilled in the art. In one embodiment, a pre-determined number of service requests are provided. The database 300 is compiled until the pre-determined number of service requests has been received by the call center 170. In another embodiment, the database 300 is compiled for a provided pre-determined timeframe (e.g., a day, week, or a month). In one embodiment, a confidence factor is generated in response to the received data, and the confidence factor is applied to the data. The confidence factor, in various embodiments, is based on the number of data points, geographical distance between data points, road density in the area of the data points, a road connectivity factor, speed, heading, urban canyon determinations, and other factors that affect the data collection. The pre-determined number and timeframe of service requests needed to form the database 300 may be specified at the hosting portal 160, call center 170, or by other means. Once the pre-determined condition(s) of database 300 compilation is/are met, the method may proceed. Alternatively, the method may proceed without meeting the pre-determined conditions.

At step 240, a plurality of eligible service requests is determined based on the time and date of the received service requests in the database 300. Eligible service requests are those requests made during particular dates and times. The eligible service requests may be determined according to an algorithm that recognizes repetition of the dates and times of service requests stored in the database 300, or by other suitable means. In one embodiment, at least one eligibility date and time interval is provided. The service requests in the database 300 are divided by each day of the week. If the time and date of a service request falls within the provided eligibility date and time interval, then that particular service request is determined as eligible.

In one embodiment, service requests placed on business days during so called "rush-hour" time intervals are determined as eligible. The "rush-hour" time intervals may be determined from historical or real-time travel times for a particular road, city, or region, which are generally available from traffic reporting services (e.g., such as those provided by the departments of transportation of metropolitan areas). Eligible service requests 310, 320 falling within an exemplary "rush-hour" period (e.g., on business days within times of 8:00 AM-10:00 AM and 4:00 PM-6:00 PM) are shown in FIG. 3. The eligible service requests need not be traffic information requests. For example, vehicle users commonly make other requests during an eligibility date and time interval (e.g., directory assistance, call assistance, etc.). These other type of service requests may be eligible and therefore be used for determining a traffic profile (described below). In another embodiment, another algorithm is provided for determining eligible service requests. Those skilled in the art will recognize that a number of strategies may be implemented for determining eligible service requests.

At step 250, a traffic profile is determined based on a comparison of digital map data to vehicle location data of the eligible service requests. In one embodiment, the latitudinal and longitudinal coordinates and/or location identifier data of the eligible service requests is compared to a digital map to locate the mobile vehicle. If the coordinates and/or the location identifier data within the eligible service request match a road represented in the digital map, then the time, date, and road information are added to the traffic profile. If the coordinates and/or the location identifier data within the service request do not match to a road represented in the digital map, then the time, date, and the vehicle location data are added to the traffic profile. As such, the traffic profile includes specific road route information and/or general vicinity information as well as corresponding times and dates. The road route information and/or general vicinity information is linked successively from road/vicinity to road/vicinity to determine a driver route, such as a commute route. In this manner, a traffic profile including a driver route is generated transparently and in automated fashion, without the need for manual configuration (i.e., through a World-Wide-Web site), but simply through repeated service requests made by the vehicle user. Should the determined driver route include some undefined portions (e.g., "gaps"), the database 300 is compiled further to determine those portions from future service requests, in one embodiment.

In the event of at least one undefined portion, database 300, in certain embodiments, is further analyzed. A confidence factor is determined, in one embodiment, to provide a measure of accuracy. In one embodiment, the confidence factor is responsive, in part, to a determination of road connectivity. In another embodiment, the confidence factor is responsive, in part to a determination of road density. In another embodiment, the confidence factor is responsive to a comparison of known road segments terminating in the geographical vicinity of a known portion. In another embodiment, the confidence factor is responsive, in part, to a determination of the number of data points. In another embodiment, gaps are analyzed in response to a route request history associated with a particular vehicle or a particular user.

The comparison of latitudinal and longitudinal coordinates and location identifier data to digital maps is understood in the art. In one embodiment, the digital map is a geographic information system (GIS) including built-in precision tools that allow analysis of traffic flow and vehicle speeds. For example, the GIS can determine the traffic volume of certain streets as well as the average speed of traffic flow on those streets.

At step 260, a traffic information notification is sent from the call center to the telematics unit via a wireless connection, such as the wireless carrier system 140. In one embodiment, the call center 170 monitors the traffic and road condition information for the roads and/or vicinities in the determined driver route of the traffic profile as known in the art. If traffic congestion is detected (e.g., by GIS) during the dates, times, and road/vicinities specified in the traffic profile and driver route, the call center 170 sends a traffic information notification to the MVCU 110. The traffic information notification includes traffic information for specific portion(s) of the driver route of the traffic profile or for the entire driver route of the traffic profile, in one embodiment.

At step 270, the database 300 is stored. In one embodiment, the database 300 is stored at the MVCU 110, web-hosting portal 160, and/or the call center 170. In one embodiment, the database 300 is shared between the locations and modified, for example, by a vehicle user via the web-hosting portal 160. In another embodiment, the database 300 is stored at one or more other locations.

The method terminates at step 280 and is repeated as appropriate. Those skilled in the art will recognize that the step order may be varied and is not limited to the order defined herein.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of determining a traffic profile, the method comprising:
   receiving a plurality of service requests at a call center from a telematics unit via a wireless connection, the service request including time, date, and vehicle location data;
   compiling a database of the received service requests;
   determining a plurality of eligible service requests based on the time and date of the received service requests in the database; and
   determining a traffic profile based on a comparison of digital map data to vehicle location data of the eligible service requests.

2. The method of claim 1 wherein the vehicle location data is selected from a group consisting of latitudinal and longitudinal coordinates, speed, heading, and a location identifier data.

3. The method of claim 2 wherein the location identifier data is selected from a group consisting of an address, a road identifier, an intersection, and a landmark.

4. The method of claim 1 wherein the determining of the plurality of eligible service requests is based on at least one provided eligibility date and time interval.

5. The method of claim 1 wherein the traffic profile comprises time, date, and road information.

6. The method of claim 1 wherein the traffic profile comprises time, date, and vehicle location data.

7. The method of claim 1 wherein determining the traffic profile comprises determining a driver route.

8. The method of claim 1 further comprising sending a traffic information notification based on the determined traffic profile from the call center to the telematics unit via a wireless connection.

9. The method of claim 1 further comprising storing the database.

10. A computer usable medium including computer readable code for determining a traffic profile, the code comprising:
    computer readable program code for receiving a plurality of service requests at a call center from a telematics unit via a wireless connection, the service request including time, date, and vehicle location data;
    computer readable program code for compiling a database of the received service requests;
    computer readable program code for determining a plurality of eligible service requests based on the time and date of the received service requests in the database; and computer readable program code for determining a traffic profile based on a comparison of digital map data to vehicle location data of the eligible service requests.

11. The computer usable medium of claim 10, wherein the vehicle location data is selected from a group consisting of latitudinal and longitudinal coordinates, speed, heading, and a location identifier data.

12. The computer usable medium of claim 11, wherein the location identifier data is selected from a group consisting of an address, a road identifier, an intersection, and a landmark.

13. The computer usable medium of claim 10, wherein the determining of the plurality of eligible service requests is based on at least one provided eligibility date and time interval.

14. The computer usable medium of claim 10, wherein the traffic profile comprises time, date, and road information.

15. The computer usable medium of claim 10, wherein the traffic information is determined for at least a portion of the traffic profile.

16. The computer usable medium of claim 10, wherein the computer readable program code for determining the traffic profile comprises computer readable program code for determining a driver route.

17. The computer usable medium of claim 10, further comprising computer readable program code for sending a traffic information notification based on the determined traffic profile from the call center to the telematics unit via a wireless connection.

18. The computer usable medium of claim 10, further comprising computer readable program code for storing the database.

* * * * *